United States Patent [19]

Oishi et al.

[11] Patent Number: 4,608,617
[45] Date of Patent: Aug. 26, 1986

[54] MAGNETIC RECORDING DISK CARTRIDGE

[75] Inventors: Kengo Oishi; Tuyoshi Ono, both of Odawara, Japan

[73] Assignee: Fuji Photo Film Co., Ltd., Odawara, Japan

[21] Appl. No.: 521,544

[22] Filed: Aug. 9, 1983

[30] Foreign Application Priority Data

Aug. 18, 1982 [JP] Japan .................... 57-124627[U]

[51] Int. Cl.$^4$ ............................................. B11B 23/02
[52] U.S. Cl. ........................................ 360/133; 360/97; 360/99
[58] Field of Search ........................... 360/133, 97, 99

[56] References Cited

U.S. PATENT DOCUMENTS

| 4,078,246 | 3/1978 | Berthoux et al. | 360/133 |
| 4,184,184 | 1/1980 | Hedin et al. | 360/133 |
| 4,532,564 | 7/1985 | Larson et al. | 360/97 |

Primary Examiner—John H. Wolff
Attorney, Agent, or Firm—Gerald J. Ferguson, Jr.; James E. Bryan; Michael P. Hoffman

[57] ABSTRACT

A magnetic recording disk cartridge comprises a recording disk having a circular recording medium and a hub secured thereto, and a casing for accommodating the recording disk. The cartridge is provided with a hub lock for preventing rotation of the recording disk and closing a magnetic head receiving opening in the casing when the cartridge is not in use. The hub is provided with a plurality of axially extending engaging grooves on the peripheral surface thereof, and the base wall of the casing is provided with a plurality of inwardly projecting walls spaced from each other along the periphery of the hub opening for permitting a drive shaft to have access to the hub. The hub lock comprises a hub locking member having an annular bearing portion which slidably engages the inwardly projecting walls for rotation thereabout, a shutter portion integrally extending from the bearing portion and an engaging portion formed integrally with the bearing portion to resiliently project toward the hub, and an operating member for swinging the hub locking member about the central axis of the hub between an operative position in which the shutter portion closes the magnetic head receiving opening and the engaging portion projects toward the hub through the space between the adjacent walls beyond the inner surface of the wall to engage with the engaging grooves of the hub, and an inoperative position in which the shutter portion is retracted from the magnetic head receiving opening to open it and said engaging portion is disengaged from the engaging grooves of the hub whereby the disk is free to rotate.

3 Claims, 4 Drawing Figures

MAGNETIC RECORDING DISK CARTRIDGE

BACKGROUND OF THE INVENTION

1. Field of the Invention

This invention relates to a magnetic recording disk cartridge, and more particularly to a magnetic recording disk cartridge for a magnetic recording disk which is small in diameter and extremely thin in thickness and which is rotated at a high speed for recording or reproduction.

2. Description of the Prior Art

There has come into wide use as a recording medium for an electronic computer a floppy disk which is a flexible disk of polyester resin coated with magnetic material on the both sides thereof and on which digital information is recorded by a magnetic head. The floppy disk is easy to handle and inexpensive.

Recently, there has been proposed a photographic still camera in which, instead of a conventional silver salt photographic film which cannot be reused, a magnetic recording disk smaller than the floppy disk both in thickness and diameter is used as a recording medium. This still camera is generally referred to as "an electronic camera". This electronic camera is generally as large as a typical 35 mm photographic camera. In the electronic camera the image of an object is magnetically recorded on the magnetic recording disk while the disk is rotated at a high speed. Generally the magnetic recording disk for the electronic camera is accommodated in a hard casing to form a cartridge and is loaded in the camera body together with the casing.

Though in the conventional floppy disk, the disk is provided with an engaging hole at its center to be supported on its both side, the recording disk for the electronic camera is provided with a hub at its center, the hub being adapted to be engaged with a rotational shaft inserted into the cartridge from one side thereof.

In recording images using a magnetic recording medium, signals recorded on the magnetic recording medium at high density since video signals have a wider frequency band than digital signals or audio signals. Accordingly, when fine unevenness, scratches or flaking exists in the magnetic coating on the magnetic recording medium or when dust is deposited on the magnetic coating, so-called drop-out occurs during reproduction and the recorded signals cannot be faithfully reproduced. Since the magnetic recording disk cartridge for the electronic camera is frequently used outside, it is normally subjected to vibrations while carried and the surface of the magnetic coating on the recording disk is apt to be brought into contact with the inner surface of the hard casing and scratched thereby. Further, dust is apt to get into the inside of the casing through a magnetic head receiving opening formed in the casing through which a magnetic head has access to the recording disk for recording or reproduction.

SUMMARY OF THE INVENTION

In view of the foregoing observations and description, the primary object of the present invention is to provide a magnetic recording disk cartridge which can protect the part of the recording disk in the magnetic head receiving opening and can prevent dust from getting into the casing, and in which the surfaces of the recording disk are prevented from being brought into contact with the inner surface of the casing and scratched thereby when the cartridge is subjected to vibrations.

The magnetic recording disk cartridge in accordance with the present invention comprises a recording disk having a circular flexible recording medium and a hub secured to the central portion of the recording medium, and a casing in which the recording disk is accommodated, the casing being provided with a hub opening, at the center of the base wall, for permitting means for rotating the recording disk to have access to the hub and a magnetic head receiving opening extending radially outwardly from the hub opening for giving the magnetic head access to the recording medium, in which said hub is provided with a plurality of axially extending engaging grooves on the peripheral surface thereof, said base wall of the casing is provided with a plurality of inwardly projecting walls spaced from each other along the periphery of the hub opening to surround the hub, and a hub locking device is provided in the casing to releasably lock the hub to prevent rotation of the recording disk and to close the magnetic head receiving opening when the cartridge is not in use, the hub locking device comprising a hub locking member having an annular bearing portion which receives the inwardly projecting walls for rotation around the walls, a shutter portion integrally extending from the bearing portion and an engaging portion formed integrally with the bearing portion to resiliently project toward the hub, and an operating member for swinging the hub locking member about the central axis of the hub between an operative position in which said shutter portion closes the magnetic head receiving opening and said engaging portion projects toward the hub through the space between the adjacent walls beyond the inner surface of the wall to engage with the engaging grooves of the hub, and an inoperative position in which said shutter portion is retracted from the magnetic head receiving opening to open it and said engaging portion is disengaged from the engaging grooves of the hub.

In the cartridge of the present invention, the surfaces of the recording medium are prevented from being scratched by the inner surfaces of the casing when the cartridge is subjected to vibrations since the recording disk is fixed with respect to the casing by the hub locking member when the cartridge is not in use. Further, dust cannot get into the casing when the cartridge is not in use since the magnetic head receiving opening is closed by the shutter portion of the hub locking member.

DESCRIPTION OF THE PREFERRED EMBODIMENTS

Figure 1:
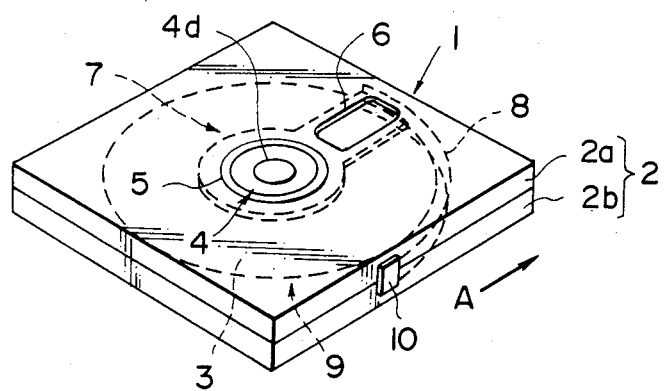
FIG. 1 is a perspective view of a magnetic recording disk cartridge in accordance with an embodiment of the present invention.
Figure 2:
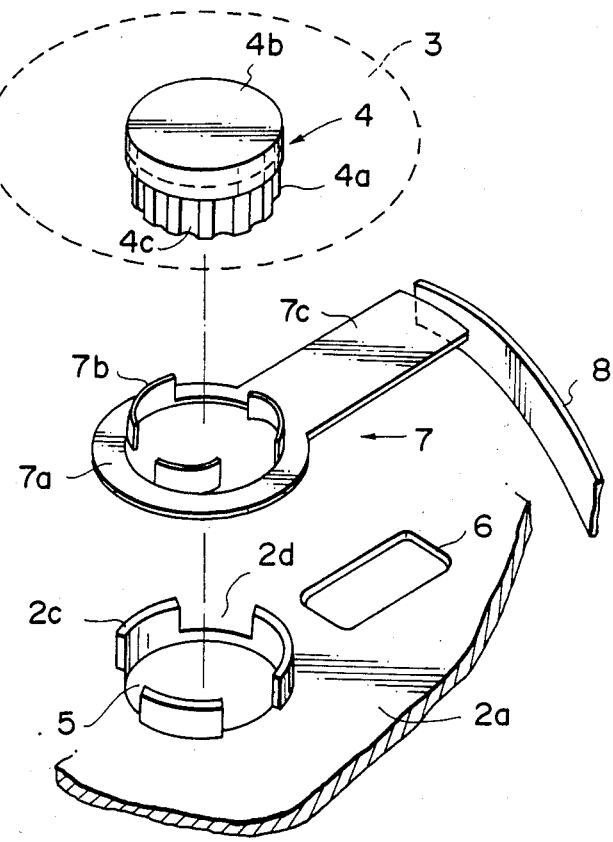
FIG. 2 is an exploded fragmentary perspective view of the upper half of the casing of the cartridge of FIG. 1, and FIGS. 3A and 3B are views for illustrating the operation of the cartridge of FIG. 1.

Referring to FIGS. 1 and 2, a magnetic recording disk cartridge 1 in accordance with an embodiment of the present invention includes a substantially rectangular hard casing 2 and a magnetic recording disk 9 accommodated therein. The casing 2 comprises an upper half 2a and a lower half 2b. The magnetic recording disk 9 comprises a thin flexible circular recording medium 3 and a cylindrical hub 4 secured to the central portion thereof. The recording medium 3 comprises a very thin base sheet, e.g., a polyester sheet not thicker than 50μ, bearing thereon a magnetic layer applied thereto by coating, vapor deposition, sputtering or the like. The hub 4 comprises an upper hub half 4a and a lower hub half 4b which are opposed to each other sandwiching the central portion of the recording medium 3 and are secured thereto by ultrasonic welding, for example. The upper hub half 4a is provided with a plurality of grooves 4c extending in the axial direction on the peripheral surface and an engaging hole 4d on the free end face. The engaging hole 4d is adapted to be engaged with a driving shaft (not shown) provided in a system using the cartridge 1, e.g., an electronic camera or a reproducing system, to rotate the recording disk 9 at a high speed. The cross-sectional shape of the grooves 4c may be semicircular, V-shaped, U-shaped or of any other suitable shape. The upper half 2a of the casing 2 is provided, at the center of the base wall, with a hub opening 5 which is aligned with the free end face of the upper hub half 4a to expose the engaging hole 4d therein. Further, the base wall of the upper hub half 2a is provided with a magnetic head receiving opening 6 extending radially outwardly from the hub opening 5 adjacent to the side edge of the casing 2 from which the cartridge 1 is inserted into the system using it (the cartridge 1 being inserted into the system by moving in the direction of the arrow A in FIG. 1). The magnetic head receiving opening 6 is substantially rectangular in shape. Along the periphery of the hub opening 5 are formed a plurality of arcuate walls 2c which extend inwardly spaced from each other.

A hub locking member 7 comprises an annular bearing portion 7a having a central opening and a shutter portion 7c in the form of an elongate plate radially outwardly extending from the bearing portion 7a. A plurality of locking pieces 7b stand along the inner periphery of the bearing portion 7 spaced from each other. The rear (as seen in the clockwise direction in FIG. 2) end portion of each locking piece 7b is resiliently bent inwardly while the lower edge of the locking piece is free from the bearing portion 7a at the rear end portion and is secured to the bearing portion 7a at the remaining portion. The annular bearing portion 7a receives therein the arcuate walls 2c on the base wall of the upper half 2a for rotation around the walls 2c. That is, the hub locking member 7 can rotate about the axis of the hub 4 or the central axis passing through the center of the central opening of the bearing portion 7a to move the shutter portion 7b between an operative position in which it is placed below the magnetic head receiving opening 6 to close it and a retracted position in which it is retracted from the magnetic head receiving opening 6 to open it, as will be described in more detail hereinbelow. The locking pieces 7b and the arcuate walls 2c are the same in number and are positioned relatively to each other so that the inwardly bent rear end portion of each locking piece 7b projects inwardly beyond the inner surface of the each wall 2c through the space between the adjacent pair of walls 2c when the shutter portion 7c is in the operative position. The upper hub half 4a projects into the space surrounded by the arcuate walls 2c so that the grooves 4c thereon are engaged with the rear end portions of the locking pieces 7b when the shutter portion 7c is in the operative position and the rear end portions of the locking pieces 7b project inwardly beyond the inner surface of the walls 2c. When the shutter portion 7c is moved to the retracted position and the bearing portion 7a is rotated around the arcuate walls 2c, the inwardly bent rear end portions of the locking pieces 7b are pushed outwardly by the arcuate walls away from the grooves 4c of the upper hub half 4a overcoming their own resiliency, whereby the hub 4 is released from the locking pieces 7b to rotate freely. The hub locking member 7 is formed of a resilient material such as steel or polypropylene to give resiliency to the locking pieces 7b. An operating member 8 in the form of a resilient belt made of steel, for example, is connected to the free end of the shutter portion 7c of the hub locking member 7 at one end. The other end of the operating member 8 projects outside the casing 2 through a slit 8a (see FIGS. 3A and 3B) formed in one of the side walls extending in the direction of the arrow A in which the cartridge 1 is moved to be inserted into the system using it, and is connected to a sliding knob 10. The sliding knob 10 is slidable along the side wall of the casing 2.

Figure 3A:
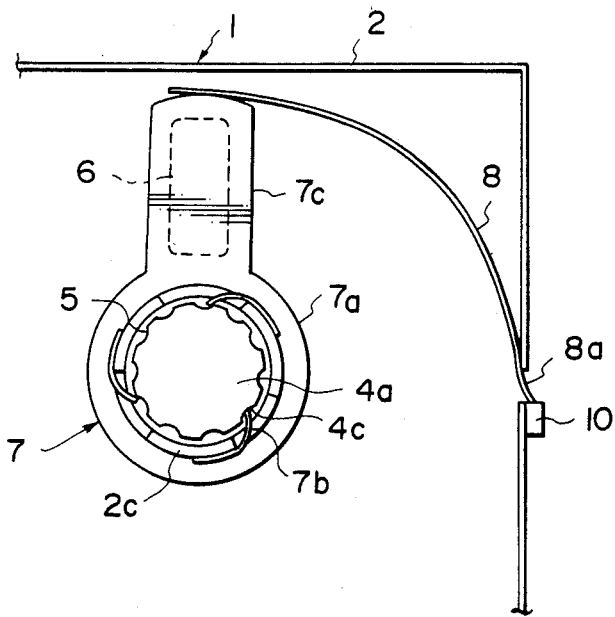

Now the operation of the magnetic recording disk cartridge 1 of this embodiment will be described referring to FIGS. 3A and 3B. When the cartridge 1 is not in use, the sliding knob 10 is positioned near the slit 8a and the hub locking member 7 is positioned with the shutter portion 7c in the operative position and the rear end portion of each locking piece 7b projecting inwardly beyond the inner surface of the wall 2c to be engaged with a groove 4c of the upper hub half 4a to prevent rotation of the hub 4 or the recording disk 9 as shown in FIG. 3A. When the hub locking member 7 is in the position shown in FIG. 3A, the shutter portion 7c closes the magnetic head receiving opening 6 and the locking pieces 7b prevent the rotation of the disk 9 as described above. Accordingly, the part of the recording disk 9 in the magnetic head receiving opening 6 is protected and at the same time dust is prevented from entering the inside of the casing 2. Further, the surface of the recording medium 3 is prevented from being brought into contact with the inner surface of the hard casing 2 and scratched thereby when the cartridge is subjected to vibrations. As can be seen from FIG. 3A, when the locking member 7 is in this position, the major part of the operating member 8 is in the casing 2.

Figure 3B:
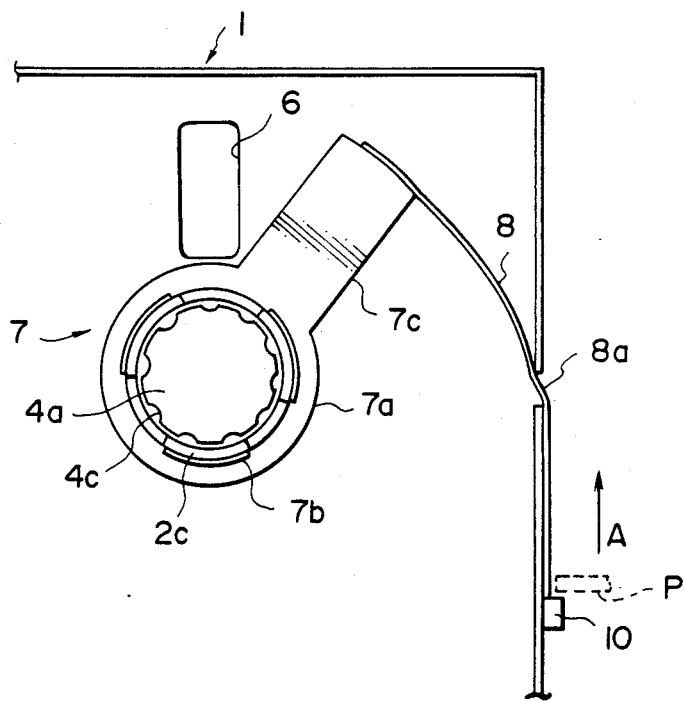

During insertion of the cartridge 1 into the system using it in the direction of the arrow A the sliding knob 10 abuts against an engaging projection P provided in the system and is pushed away from the slit 8a to slide in the direction opposite to the arrow A as shown in FIG. 3B. When the sliding knob 10 slides away from the slit 8a, the operating member 8 is drawn out from the slit 8a to rotate the locking member 7 in the clockwise direction. When the locking member 7 is rotated in the clockwise direction, the shutter portion 7c is moved to the retracted position away from the magnetic head receiving opening 6 to open it and at the same time the locking pieces 7b are rotated relatively to the arcuate walls 2c, whereby the rear end portion of each locking piece 7b is pushed by the wall 2c outwardly to behind the wall 2c. Accordingly, the locking pieces 7b are disengaged from the grooves 4c of the upper hub half 4a to release the hub 4 and the recording disk 9. Thus, by inserting the cartridge 1 into the system using it, the recording disk 1 is automatically released from the locking member 7 and at the same time the magnetic head receiving opening 6 is automatically opened to permit insertion of the magnetic head. If desired, the sliding knob 10 may be manually slid. Since the operating member 7 has resiliency, it always maintains its arcuate position during movement between the positions shown in FIGS. 3A and 3B and therefore cannot strike against the recording disk 9.

We claim:

1. A magnetic recording disk cartridge comprising a recording disk having a circular flexible recording medium and a hub, having an axis and a peripheral surface, secured to the central portion of the recording medium, and a casing, having a base wall, in which the recording disk is accommodated, the casing being provided with a hub opening, at the center of the base wall, for permitting means for rotating the recording disk to have access to the hub and a magnetic head receiving opening extending radially outwardly from the hub opening for giving a magnetic head access to the recording medium, in which said hub is provided with a plurality of axially extending engaging grooves on the peripheral surface thereof, said base wall of the casing is provided with a plurality of projecting walls spaced from each other along the periphery of the hub opening to surround the hub, said projecting walls being disposed substantially perpendicularly to said base wall, said projecting walls having an inner perimeter and an outer perimeter, and a hub locking device is provided in the casing to releasably lock the hub to prevent rotation of the recording disk and to close the magnetic head receiving opening when the cartridge is not in use, the hub locking device comprising a hub locking member having an annular bearing portion which slidably engages the outer perimeter of said projecting walls, said locking member being rotatable about the outer perimeter of said projecting walls, a shutter portion integrally extending from the bearing portion and an engaging portion formed integrally with the bearing portion to resiliently project toward the hub, and an operating member for swinging the hub locking member about the central axis of the hub between an operative position in which said shutter portion closes the magnetic head receiving opening and said engaging portion projects toward the hub through the space between the adjacent walls and within the inner perimeter of said projecting walls to engage with the engaging grooves of the hub, and an inopertive position in which said shutter portion is retracted from the magnetic head receiving opening to open it and said engaging portion is disengaged from the engaging grooves of the hub whereby the disk is free to rotate about said axis.

2. A magnetic recording disk cartridge as defined in claim 1 in which said operating member includes a sliding knob which is adapted to be slid, in response to insertion of the cartridge into the system which uses it, to swing said hub locking member to the inoperative position.

3. A magnetic recording disk cartridge as defined in claim 2 in which said sliding knob is connected with the hub locking member by way of a resilient belt-like member to swing the hub locking member between the operative position and the inoperative position in response to the sliding movement of the knob.

* * * * *